United States Patent
Weyland et al.

(10) Patent No.: US 12,209,174 B2
(45) Date of Patent: Jan. 28, 2025

(54) POLYPROPYLENE COMPOSITION

(71) Applicant: BASF SE, Ludwigshafen am Rhein (DE)

(72) Inventors: Tania Weyland, Kaisten (CH); Marie Laure Bertet, Levallois-Perret (FR); Heinz Herbst, Kaisten (CH)

(73) Assignee: BASF SE, Ludwigshafen am Rhein (DE)

( * ) Notice: Subject to any disclaimer, the term of this patent is extended or adjusted under 35 U.S.C. 154(b) by 139 days.

(21) Appl. No.: 17/415,572

(22) PCT Filed: Dec. 11, 2019

(86) PCT No.: PCT/EP2019/084689
§ 371 (c)(1),
(2) Date: Jun. 17, 2021

(87) PCT Pub. No.: WO2020/126752
PCT Pub. Date: Jun. 25, 2020

(65) Prior Publication Data
US 2022/0056239 A1 Feb. 24, 2022

(30) Foreign Application Priority Data
Dec. 21, 2018 (EP) ..................................... 18214993

(51) Int. Cl.
| C08F 10/10 | (2006.01) |
| C08F 10/06 | (2006.01) |
| C08K 3/26 | (2006.01) |
| C08K 5/3492 | (2006.01) |
| C08K 5/526 | (2006.01) |
| F16L 9/12 | (2006.01) |

(52) U.S. Cl.
CPC .......... *C08K 5/34926* (2013.01); *C08F 10/06* (2013.01); *C08K 3/26* (2013.01); *C08K 5/526* (2013.01); *C08K 2003/267* (2013.01); *F16L 9/12* (2013.01)

(58) Field of Classification Search
CPC ..................... C08K 2003/267; C08K 5/34926; C08K 3/26; C08F 10/06; F16L 9/12
See application file for complete search history.

(56) References Cited

U.S. PATENT DOCUMENTS

| 4,325,863 A | 4/1982 | Hinsken et al. |
| 4,338,244 A | 7/1982 | Hinsken et al. |
| 5,175,312 A | 12/1992 | Dubs et al. |
| 5,216,052 A | 6/1993 | Nesvadba et al. |
| 5,252,643 A | 10/1993 | Nesvadba |
| 6,046,304 A | 4/2000 | Borzatta et al. |
| 6,747,077 B2 * | 6/2004 | Gugumus ................ C08K 5/34 524/100 |
| 2002/0016390 A1 | 2/2002 | Gugumus |
| 2005/0049336 A1 * | 3/2005 | Gugumus ................ C08K 5/34 524/100 |
| 2005/0148700 A1 | 7/2005 | Kramer et al. |

FOREIGN PATENT DOCUMENTS

| CN | 102492226 A | 6/2012 | |
| CN | 103146028 A | 6/2013 | |
| DE | 4316611 A1 | 11/1993 | |
| DE | 4316622 A1 | 11/1993 | |
| DE | 4316876 A1 | 11/1993 | |
| EP | 0589839 A1 | 3/1994 | |
| EP | 0591102 A1 | 4/1994 | |
| EP | 0911362 A1 | 4/1999 | |
| EP | 1291384 A1 | 3/2003 | |
| JP | S61255953 A | 11/1986 | |
| JP | S63182358 A | 7/1988 | |
| JP | H0912621 A | 1/1997 | |
| JP | H11255956 A | 9/1999 | |
| JP | 2005516094 A | 6/2005 | |
| JP | 2009221387 A | * 10/2009 | ............... C08K 5/13 |
| JP | 2015523449 A | 8/2015 | |
| WO | 2015/121445 A1 | 8/2015 | |

OTHER PUBLICATIONS

JP2009221387A English translation (Year: 2009).*
European Search Report for EP Patent Application No. 18214993.0, Issued on Jun. 28, 2019, 3 pages.
Ren, et al., "Special adjuvant compositions for copolypropylene", Database CA [Online], Chemical Abstracts Service, retrieved from STN Database Accession No. 2012:857915, XP002792017, Jun. 13, 2012, 2 pages.
International Search Report issued in PCT/EP2019/084689, dated Feb. 26, 2020, pp. 1-3.

* cited by examiner

*Primary Examiner* — Catherine S Branch
*Assistant Examiner* — Huihong Qiao
(74) *Attorney, Agent, or Firm* — ArentFox Schiff LLP

(57) ABSTRACT

A polypropylene composition comprising components A), B) and C), wherein component A) is a hindered amine light stabilizer selected from the group consisting of the compounds of formulae (A-I-1), (A-I-2), (A-I-3), (A-III-1) and (A-IV-1) as defined for the present invention,
component B) is a natural or synthetic hydrotalcite,
component C) is a phenolic antioxidant selected from the group consisting of 1,3,5-tris(3,5-di-tert-butyl-4-hydroxybenzyl)-2,4,6-trimethylbenzene, ethylene bis[3,3-bis(3-tert-butyl-4-hydroxyphenyl)butyrate], 1,3,5-tris(3,5-di-tert-butyl-4-hydroxybenzyl)-isocyanurate and 6-[3-(3-tert-butyl-4-hydroxy-5-methylphenyl)propoxy]-2,4,8,10-tetra-tert-butyldibenzo[d,f][1,3,2]dioxaphosphepin,
and wherein the weight ratio of component A) to component B) is 1:10 to 10:1.

10 Claims, No Drawings

POLYPROPYLENE COMPOSITION

CROSS-REFERENCE TO RELATED APPLICATIONS

This application is a National Stage Entry of PCT/EP2019/084689, filed Dec. 11, 2019, which claims priority to EP application Ser. No. 18/214,993.0, filed Dec. 21, 2018, the disclosures of each of which are hereby incorporated by reference in their entireties.

The present invention relates to a polypropylene composition comprising specific hindered amine light stabilizers, natural or synthetic hydrotalcites and specific antioxidants.

More specifically, the present invention relates to a polypropylene composition comprising components A), B) and C), wherein component A) is a hindered amine light stabilizer selected from the group consisting of the compounds of formulae (A-I-1), (A-I-2), (A-I-3), (A-III-1) and (A-IV-1)

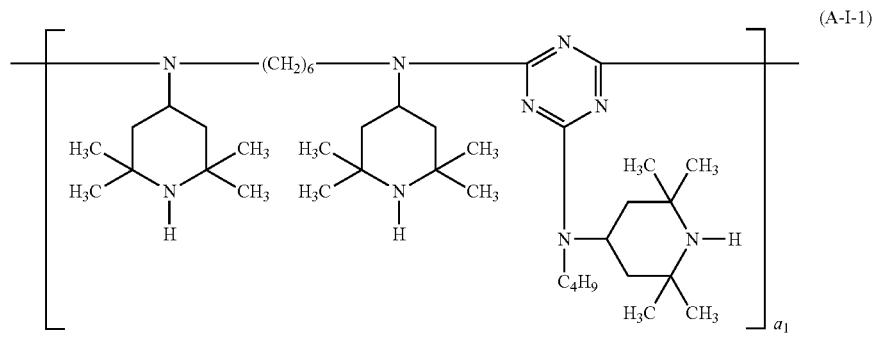
(A-I-1)

with $a_1$ being 2 to 10,

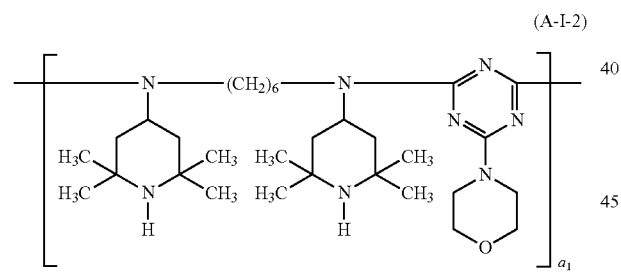
(A-I-2)

with $a_1$ being 2 to 10,

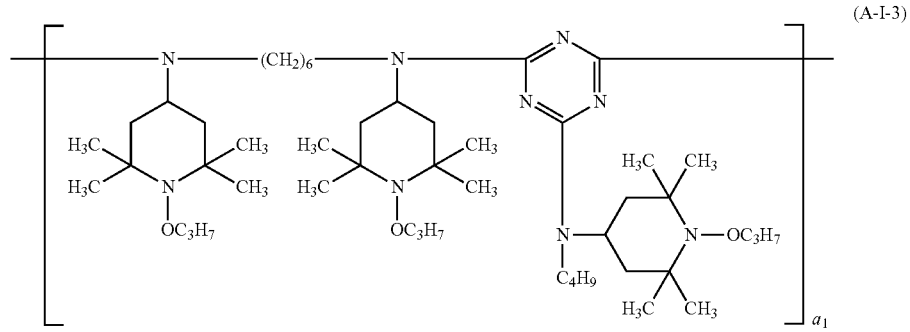
(A-I-3)

with $a_1$ being 2 to 10,

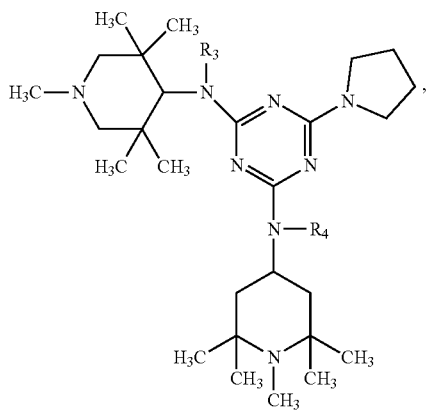

(A-III-1)

wherein $R_3$ and $R_4$ are $C_1$-$C_{22}$alkyl, $$M^{2+}{}_{1-a}M^{3+}{}_a(OH)_2(A^{b-})_{a/b} \cdot cH_2O \quad \text{(B-I)}$$

$$M^{2+}{}_d Al^{3+}{}_2(OH)_{2d+6-eb}(A^{b-})_e \cdot fH_2O \quad \text{(B-II)}$$

$M^{2+}$ is for example $Ca^{2+}$, $Mg^{2+}$, $Sr^{2+}$, $Ba^{2+}$, $Zn^{2+}$, $Pb^{2+}$, $Sn^{2+}$ or $Ni^{2+}$.

$M^{3+}$ is for example $Al^{3+}$, $B^{3+}$ or $Bi^{3+}$.

a is for example a number up to 0.5.

$A^{b-}$ is an anion of valency b, for example $Cl^-$, $Br^-$, $NO^{3-}$, $CO_3^{2-}$, $SO_4^{2-}$ or $SeO_4^{2-}$.

b is for example an integer from 1 to 4.

c is for example zero or a number up to 2.

d is for example a number up to 6.

e is for example a number up to 2.

f is for example zero or a number up to 15.

Hydrotalcites which are of interest are layered double hydroxides that contain positively charged hydroxide layers and charge balancing anions located in the interlayer region.

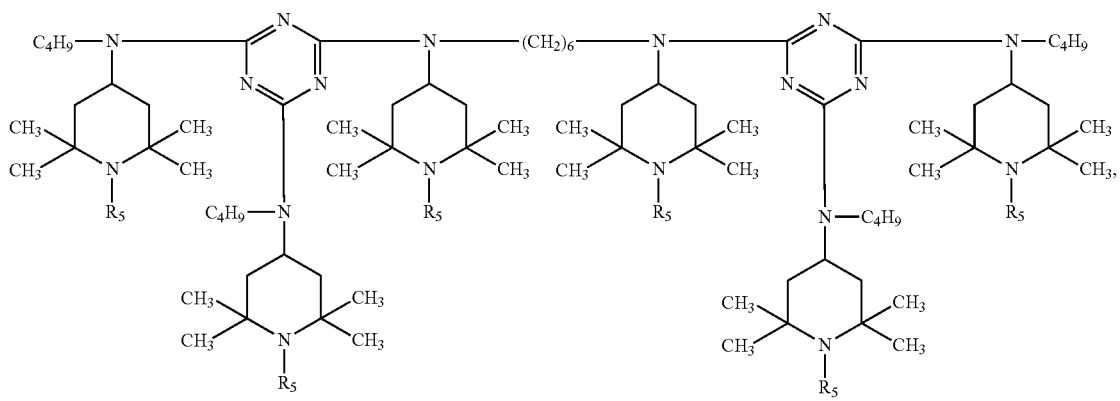

(A-IV-1)

wherein $R_5$ independently of each other are hydrogen or propoxy, component B) is a natural or synthetic hydrotalcite, component C) is a phenolic antioxidant selected from the group consisting of 1,3,5-tris(3,5-di-tert-butyl-4-hydroxybenzyl)-2,4,6-trimethylbenzene, ethylene bis[3,3-bis(3-tert-butyl-4-hydroxyphenyl)butyrate], 1,3,5-tris(3,5-di-tert-butyl-4-hydroxybenzyl)-isocyanurate and 6-[3-(3-tert-butyl-4-hydroxy-5-methylphenyl)propoxy]-2,4,8,10-tetra-tert-butyldibenzo[d,f][1,3,2]dioxaphosphepin, and wherein the weight ratio of component A) to component B) is 1:10 to 10:1, preferably 1:5 to 5:1.

Component A) is preferably a compound of formula (A-I-1), (A-I-3), (A-III-1) or (A-IV-1), especially a compound of formula (A-I-1), (A-I-3) or (A-IV-1) and more preferably a compound of formula (A-I-1) or (A-IV-1). Highly preferred are compounds of formula (A-I-1).

Component B) is preferably a mixed hydroxide of the formula (B-I) or (B-II).

Component B) is in particular at least one magnesium aluminum hydroxide carbonate hydrate which is for example commercially available as Hycite®713, DHT-4A®, DHT-4V®, DHT-4A-2®, DHT-4C® or Sorbacid®911, or zinc aluminum hydroxide carbonate hydrate which is for example commercially available as ZHT-4V® or Sorbacid®944, or mixtures thereof.

Of particular interest is a magnesium aluminum hydroxide carbonate hydrate which is for example commercially available as Hycite®713 or DHT-4A®.

Examples of alkyl having up to 22 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetra-methylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl and eicosyl.

Preferred as compound of the formula (A-I-1) is the compound of formula

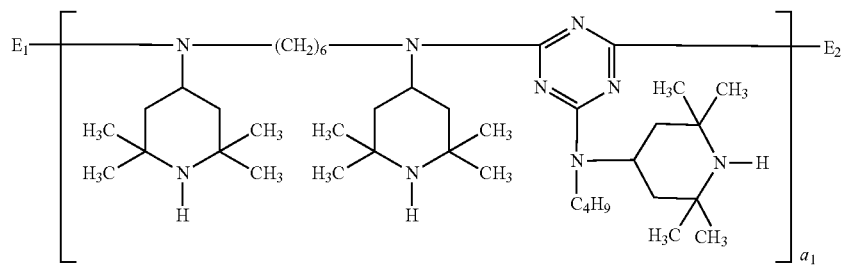
wherein
$E_1$ is 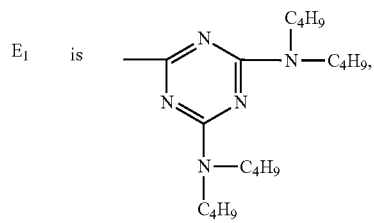
$E_2$ is 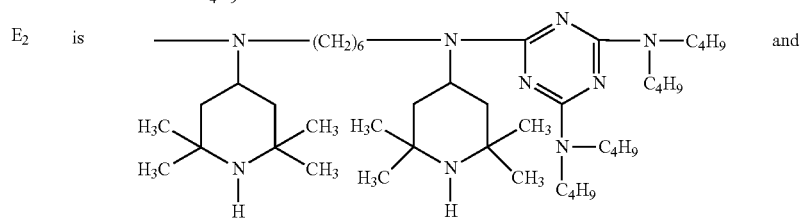 and
$a_1$ is a number from 1 to 10, preferably 2 to 10. The preparation of this compound is described in Example 10 of U.S. Pat. No. 6,046,304.
Preferred as compound of the formula (A-I-3) is the compound of formula
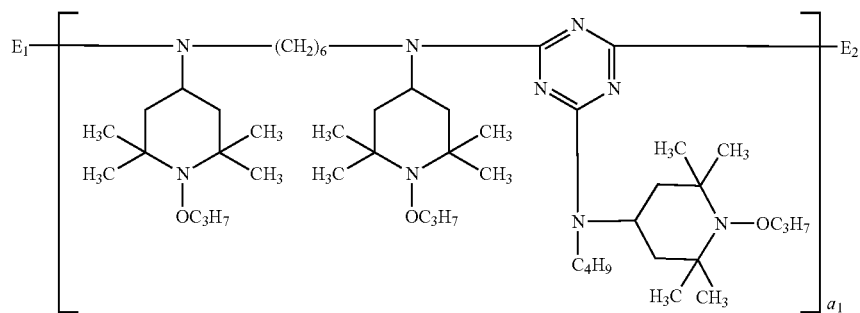
wherein
$E_1$ is
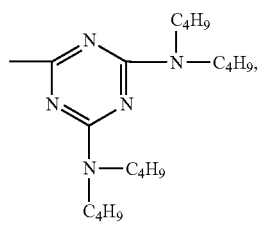

$E_2$ is

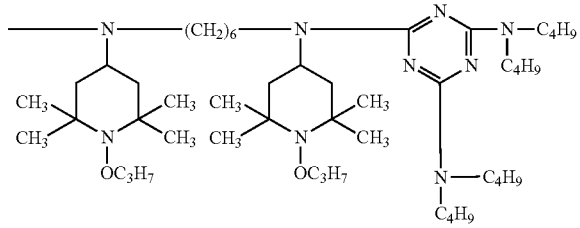

and $a_1$ is a number from 1 to 10, preferably 2 to 10.

Interesting non-triazine containing hindered amine light stabilizers, which may be present in addition, are the following:

butanedioic acid, dimethylester, polymer with 4-hydroxy-2,2,6,6-tetramethyl-1-piperidine ethanol (Tinuvin® 622);

polymer of 2,2,4,4-Tetramethyl-7-oxa-3,20-diazadispiro-(5.1.11.2)heneicosan-21-one and epichlorohydrin (Hostavin® N 30);

1-(2-hydroxy-2-methyl-propoxy)-2,2,6,6-tetramethyl-piperidin-4-yl-octadecanoic acid ester;

a compound of the formula

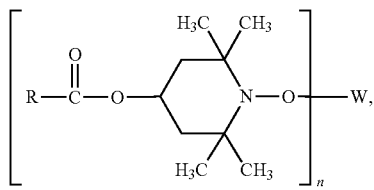

wherein

R is $C_1$-$C_{40}$alkyl, especially $C_{10}$-$C_{20}$alkyl, n is a number from 1 to 10, and W is a residue comprising between 10 and 100 carbon atoms;

a compound of the formula

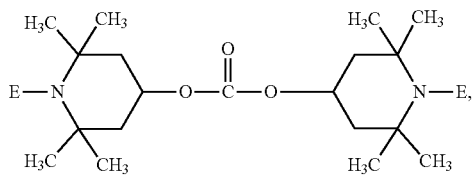

wherein the radicals E are independently of each other $C_1$-$C_{30}$alkoxy, especially $C_{10}$-$C_{20}$alkoxy.

Preferred as component C) is 1,3,5-tris(3,5-di-tert-butyl-4-hydroxybenzyl)-2,4,6-trimethylbenzene (Irganox®1330).

The weight ratio of component A) to component C) is preferably 1:10 to 10:1, in particular 1:5 to 5:1.

The polypropylene composition may further comprise a component D) which is at least one compound selected from the group consisting of phosphites, phosphonites, hydroxylamines, vitamin E and vitamin E acetate, like tocopherols and tocopherol acetates.

A phosphite, for example tris(2,4-di-tert-butylphenyl) phosphite, [3,3',5,5'-tetra-tert. butyl-1,1'biphenyl-2,2'-diyl]-[3-(3-methyl-4-hydroxy-5-tert. butyl-phenyl)-propyl]-phosphite, [2,2'-ethylene-bis-(4,6-di-tert. butyl-phenyl)-1,1'-diyl]-[2,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1-methyl-6-tert. butyl-4-(5,7-di-tert. butyl)-3H-1-benzofuran-2-one)-phenyl]-phosphite, 6-[3-(3-tert-butyl-4-hydroxy-5-methylphenyl)propoxy]-2,4,8,10-tetra-tert-butyldibenzo[d,f][1,3,2]dioxaphosphepin, bis (2,4-dicumylphenyl)pentaerythritoldiphosphite or 2,2'2''-nitrilo[triethyl-tris[3,3',5,5'-tetra-tert-butyl-1,1'-biphenyl-2,2'-diyl]]phosphite is particularly preferred.

As hydroxylamine preference is given to the Compound D-2 (see the examples hereof).

The weight ratio of component A) to component D) is preferably 1:10 to 10:1, in particular 1:5 to 5:1.

Of interest is a polypropylene composition which comprises components A), B), C) and D). The compounds of components A), B), C) and D) are known and are in essential commercially available.

Component A) is preferably present in the polypropylene composition in an amount of 0.01% to 2% by weight relative to the weight of the polypropylene.

Component B) is preferably present in the polypropylene composition in an amount of 0.01% to 5% by weight relative to the weight of the polypropylene.

Component C) is preferably present in the polypropylene composition in an amount of 0.05% to 5% by weight relative to the weight of the polypropylene.

Component D) is preferably present in the polypropylene composition in an amount of 0.05% to 5% by weight relative to the weight of the polypropylene.

According to a preferred embodiment the polypropylene composition may additionally comprise a pigment, preferably a blue pigment.

The polypropylene is preferably selected from polypropylene homopolymers, ethylene/propylene copolymers and mixtures of polypropylene with other synthetic polymers, like polyethylene, especially low and high density polyethylene. In corresponding mixtures the amount by weight of polypropylene is preferably 20 to 99%, more preferably 50 to 99%, especially 75 to 99%. Highly preferred is an amount by weight of polypropylene of 85 to 99%. As to mixtures of polypropylene with polyethylene, but also for polyethylene without polypropylene, it is an interesting embodiment to use Hostavin® N 30.

In case of copolymers the molar amount of propylene is preferably 20 to 99%, more preferably 50 to 99%, especially 75 to 99%, based on the total molar amount of propylene and ethylene. Highly preferred is an amount by weight of propylene of 85 to 99%. Preference is given to polypropylene homopolymers and ethylene/propylene copolymers, especially polypropylene homopolymers.

For example, the polypropylene may be categorized as atactic polypropylene (PP-at), syndiotactic polypropylene (PP-st) or isotactic polypropylene (PP-it).

The density of polypropylene is preferably between 0.85 and 0.95 g/cm$^3$, especially between 0.895 and 0.92 g/cm$^3$.

The used polypropylene can be virgin or recycled material or blends thereof.

A particularly preferred polypropylene composition comprises the components (A), (B), (C) and (D), wherein component (A) is a compound of formula (A-I-1), component (B) is a natural or synthetic hydrotalcite, component (C) is 1,3,5-tris(3,5-di-tert-butyl-4-hydroxybenzyl)-2,4,6-trimethylbenzene, and component (D) is tris[2,4-di-tert-butylphenyl]phosphite.

The polypropylene composition according to the present invention may further comprise one or more conventional additives such as:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methylpentadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxybenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris (3,5-di-tert-butyl-4-hydroxy-phenylpropionyl)-hexahydro-1,3,5-triazine, 1,3,5-tris(3,5-dicyclohexyl-4-hydroxybenzyl) isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, di-octadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of 8-(3,5-di-tert-butyl-4-hydroxphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyhpropionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl-propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxphenyl)-5-chlorobenzotriazole, 2-(3'-tert-butyl-2'-hydroxy-5'-methylphenyl)-5-chloro-benzotriazole, 2-(3'-sec-butyl-5'-tert-butyl-2'-hydroxphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethyl-butyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-β-methoxycinnamate, N-(β-carbomethoxy-β-cyanovinyl)-2-methylindoline, neopentyl tetra(α-cyano-β,β-diphenylacrylate.

2.5. Sterically hindered amines, for example 1,6-Hexanediamine N, N'-bis(1-propyloxy-2,2,6,6-tetramethyl-4-piperidinyl)-N, N'-bis-2-[4,5-bis-(N-n-butyl-N'-1-propyloxy-2,2,6,6-tetramethyl-4-piperidinyl)-1,3,5-triazine], 1,6-Hexanediamine N, N'-bis(2,2,6,6-tetramethyl-4-piperidinyl)-N, N'-bis-2-[4,5-bis-(N-n-butyl-N'-2,2,6,6-tetramethyl-4-piperidinyl)-1,3,5-triazine], carbonic acid bis (1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine, 2.6 Benzoxazinone derivatives such as e.g. 2,2'-(1,4-phenylene)bis[4H-3,1-benzoxazin-4-one] (CAS No. 018600-59-4).

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine, 2-(4,6-bis-biphenyl-4-yl-1,3,5-triazin-2-yl)-5-(2-ethyl-(n)-hexyloxy)phenol.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bi-sphenylhydrazide, N,N'-diacetyladipoyl dihydrazide, N,N'-bis(salicyloyl)oxalyl dihydrazide, N,N'-bis(salicyloyl)thiopropionyl dihydrazide.

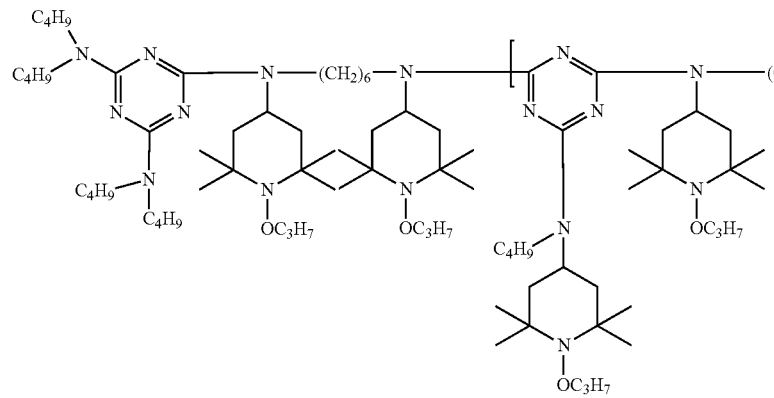
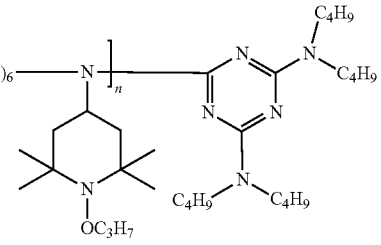

3a. Formamidines, for example Ethoxycarbonylphenyl)-N'-ethyl-N'-phenyl formamidine.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butyl-phenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol tri-phosphite, tetrakis(2,4-di-tert-butylphenyl) 4,4'-biphenylene diphosphonite, [3,3',5,5'-tetra-tert. butyl-1,1'biphenyl-2,2'-diyl]-[3-(3-methyl-4-hydroxy-5-tert. butyl-phenyl)-propyl]-phosphite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, tris-[4-tert. butyl-2-(5-tert. butyl-3H-1-benzofuran-2-one)-phenyl]-phosphite, tris-[4-(1,1'3,3'-tetramethyl-butane)-2-(5-(1,1'3,3'-tetramethyl-butane-3H-1-benzofuran-2-one)-phenyl]-phosphite, tris-[2,6-dimethyl-(5,7-di-tert. butyl)-3H-1-benzofuran-2-one)-phenyl]-phosphite, bis-[2,6-dimethyl-(5,7-di-tert. butyl)-3H-1-benzofuran-2-one)-phenyl]-phenyl-phosphite, bis-[2,6-dimethyl-(5,7-di-tert. butyl)-3H-1-benzofuran-2-one)-phenyl]-[2,4-di-tert. butyl-phenyl]-phosphite, [3,3',5,5'-tetra-tert. butyl-1,1'biphenyl-2,2'-diyl]-[4-tert. butyl-(5-tert. butyl)-3H-1-benzofuran-2-one)-phenyl]-phosphite, [3,3',5,5'-tetra-tert. butyl-1,1'biphenyl-2,2'-diyl]-[2,6-dimethyl-(5,7-di-tert. butyl)-3H-1-benzofuran-2-one)-phenyl]-phosphite, [2,2'-methylene-bis-(4,6-di-tert. butyl-phenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1-methyl-6-tert. butyl-4-(5,7-di-tert. butyl)-3H-1-benzofuran-2-one)-phenyl]-phosphite, bis-(2,6-dimethyl-(5,7-di-tert. butyl)-3H-1-benzofuran-2-one)-phenol) pentaerythritol diphosphite, bis-(1-methyl-6-tert. butyl-(5,7-di-tert. butyl)-3H-1-benzofuran-2-one)-phenol) pentaerythritol diphosphite, bis-(4-tert. butyl-(5-tert. butyl)-3H-1-benzofuran-2-one)-phenol) pentaerythritol diphosphite, 50 bis-(4-(1,1'3,3'-tetramethyl-butane)-(5-(1,1'3,3'-tetramethyl-butane))-3H-1-benzofuran-2-one)-phenol) pentaerythritol diphosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba Specialty Chemicals Inc.), tris(nonylphenyl) phosphite, phosphorus acid mixed 2,4-bis(1,1-dimethylpropyl) phenyl and 4-(1,1-dimethylpropyl)phenyl triesters (CAS Reg. No. 939402-02-5), phosphorous acid triphenyl ester polymer with alpha-hydro-omega-hydroxypoly[oxy(methyl-1,2-ethanediyl) C10-16 alkyl esters (CAS Reg. No. 1227937-46-3).

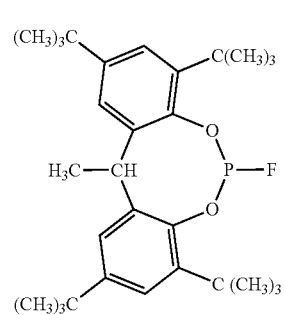
(A)

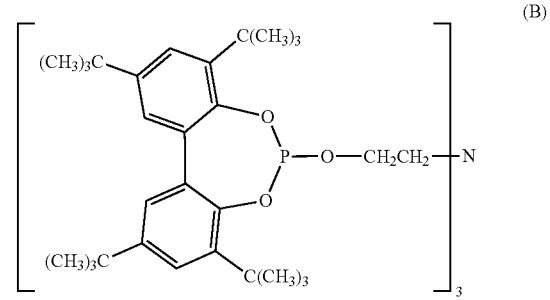
(B)

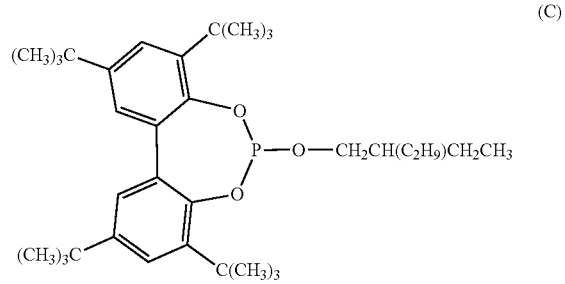
(C)

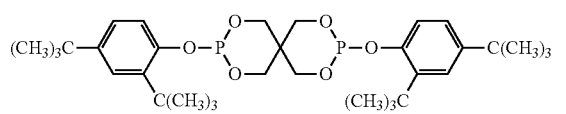
(D)

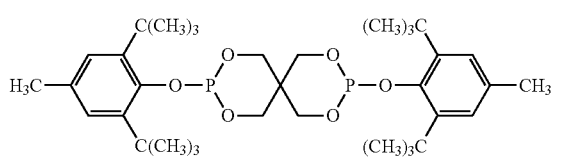
(E)

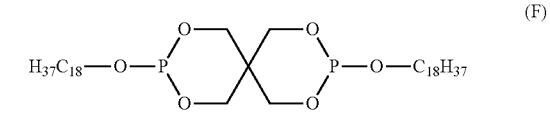
(F)

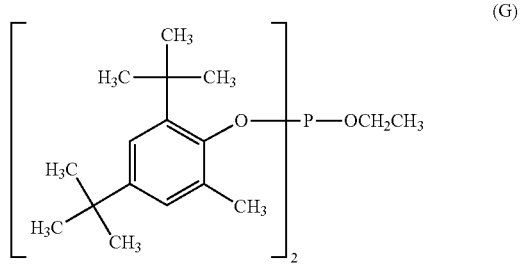
(G)

[2,2'-ethylene-bis-(4,6-di-tert. butyl-phenyl)-1,1'-diyl]-[1,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1-methyl-6-tert. butyl-4-(5,7-di-tert. butyl)-3H-1-benzofuran-2-one)-phenyl]-phosphite, [3,3',5, 5'-tetra-tert. butyl-1,1'biphenyl-2,2'-diyl]-[3-(3-methyl-4-hydroxy-5-tert. butyl-phenyl)-propyl]-phosphite.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Amine oxides, for example N,N-dibenzylhydroxylamine oxide, N,N-diethylhydroxylamine oxide, N,N-dioctylhydroxylamine oxide, N,N-dilaurylhydroxylamine oxide, N,N-ditetradecylhydroxylamine oxide, N,N-dihexadecylhydroxylamine oxide, N,N-dioctadecylhydroxylamine oxide, N-hexadecyl-N-octadecylhydroxylamine oxide, N-heptadecyl-N-octadecylhydroxylamine oxide, N,N-dialkylhydroxylamine oxide derived from hydrogenated tallow amine.

7. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

8. Thiosynergists, for example dilauryl thiodipropionate, dimistryl thiodipropionate, distearyl thiodipropionate, pentaerythritol tetrakis[3-(dodecylthio)propionate] or distearyl disulfide.

9. Peroxide scavengers, for example esters of p-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(p-dodecylmercapto)propionate.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate, zeolithes, hydrotalcites, hydrocalumites.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol. Beta-nucleating agents are also of interest.

12. Fillers and reinforcing agents, for example calcium carbonate, silicates, glass fibres, carbon fibers, glass beads, asbestos, talcum (preferably with a particle size of 0.01 to 20 μm), kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctylbenzofuran-2-one.

The conventional additive may be present in the polypropylene composition according to the present invention in an amount of e.g. 0.001 to 10%, relative to the weight of the polypropylene.

Components A), B) and C) as well as optional further additives of the invention may readily be incorporated into the polypropylene by conventional techniques, at any convenient stage prior to the manufacture of shaped articles therefrom.

Components A), B) and C) may be added together or successively, if desired at different stages of processing the polypropylene.

Components A), B) and C) as well as optional further additives can judiciously be incorporated by one of the following methods:
as emulsion or dispersion
as a dry mixture during the blending
by direct introduction into the processing apparatus (e.g. extruders, internal mixers)
as melt.

Incorporation of Components A), B) and C) as well as optional further additives is performed best in a thermal compounding step. Thorough blending of Components A), B) and C) as well as optional further additives is followed by an extrusion of the physical blend at elevated temperature. Typically, an extruder with suitable screw configuration is used for this step.

Components A), B) and C) as well as optional further additives of the invention can also be added to the polypropylene in the form of a masterbatch ('concentrate'), which contains components A), B) and C) as well as optional further additives of the invention incorporated in a further polymer of the masterbatch, like in polypropylene. The concentration for the additives in such masterbatch is, for example, from 1% to 90%, preferably 1% to 40%, and in particular 2.5% to 25% by weight of the masterbatch. The polymer, like polypropylene, may be present in such masterbatch in a concentration of 10% to 99%, preferably 60% to 99%, and in particular 75% to 97.5%. Said polymer of the masterbatch must not be necessarily polypropylene. The masterbatch can for example be in the form of a powder, granules, dispersions or in the form of latices.

The polypropylene compositions of this invention can be employed in various forms and/or processed to give various final products, for example as to obtain films, fibres, tapes, moulding compositions or profiles.

In more detail, the final product respectively article can be any type of polymeric article, which needs stabilization in natural sunlight and/or humidity at low, ambient or elevated temperature, or which needs stabilization in presence of oxidative media.

As corresponding articles pipes, cables and geomembranes, especially pipes or geomembranes, are preferred. Highly preferred are pipes.

Pipes are for example those which are in contact with chlorinated (for example common chlorinated water disinfectants such as chlorine (hypo-chlorite), chlorine dioxide and chloramines) or non-chlorinated water, in all cases including cold or hot water. Preferred are pipes which are in contact with chlorinated or non-chlorinated water, especially chlorinated water.

Cables are for example power cables, communication cables and conduits. The stabilized composition is suitable for use as cable insulation of medium and high voltage power cables. A range for medium voltage is 1 kV to 40 kV. "High voltage" relates to a valve voltage exceeding about 40 kV, especially 40-110 kV.

Geomembranes are as a rule used to provide a barrier between ground soil and other substances. For example, such membranes can be used to prevent chemicals from seeping into or out of soil or water, or for covering water that has been known to emit odors, such as industrial wastewater, for odor control.

There are three fundamental liner designs—single, double, and composite liners. Single geomembrane liners are typically used in non-critical applications. The double lining system is similar to double hulls on ships—all ship hulls leak but the ship does not sink provided the leaking water is pumped out. For the most critical applications composite lining systems consisting of a geomembrane and a clay or GCL liner are used. When there is a hole in the geomembrane the leak only acts on a small area of clay (GCL), 50 provided there is intimate contact between geomembrane and clay.

Furthermore, preference is given to pipes and geomembranes which are in contact with oxidizing media.

By use of Components A), B) and C) the detrimental effect of such oxidizing media can be reduced to a greater extent.

In case of pipes corresponding oxidizing media are, for example, chlorinated water (common chlorinated water disinfectants such as chlorine (hypo-chlorite), chlorine dioxide and chloramines). Preferred pipes are those which are in contact with chlorinated water.

In case of geomembranes oxidizing media are, for example, oxidizing organics or oxidizing acids, like sulphuric acid.

The polymeric articles may be manufactured by any process available to those of ordinary skill in the art including, but not limited to, extrusion, extrusion blowing, film casting, film blowing, calendering, injection molding, blow molding, compression molding, thermoforming, spinning, blow extrusion or rotational casting.

For the production of the desired polymeric article out of the polypropylene compositions of this invention, any appropriate equipment can be used, depending on the final form of the article, for example a blow extruder in the case of films, an extrusion machine in the case of sheets or an injection molding machine.

A further embodiment of this invention is a method for stabilizing polypropylene, preferably a polypropylene pipe, which comprises incorporating into the polypropylene components A) and B) in a weight ratio of 1:10 to 10:1 and component C).

An additional embodiment of this invention is directed to the use of a mixture containing components A) and B) in a weight ratio of 1:10 to 10:1 and component C) for stabilizing polypropylene, preferably a polypropylene pipe.

The embodiments of the present invention can for example serve for the stabilization of polypropylene being susceptible to oxidative, thermal or light-induced degradation, especially oxidative induced degradation.

Furthermore, as to pipes the embodiments of the present invention include chlorinated or non-chlorinated water pipes for domestic, municipal or industrial applications, non-pressure up to high-pressure pipe applications used for drinkable or non-drinkable water, for general purpose water or waste water.

The examples below illustrate the invention in greater detail. All percentages and parts are by weight, unless stated otherwise.

Additives used in the following examples:
Chimassorb©2020 [Component A)]:
(CAS number: 192268-64-7)

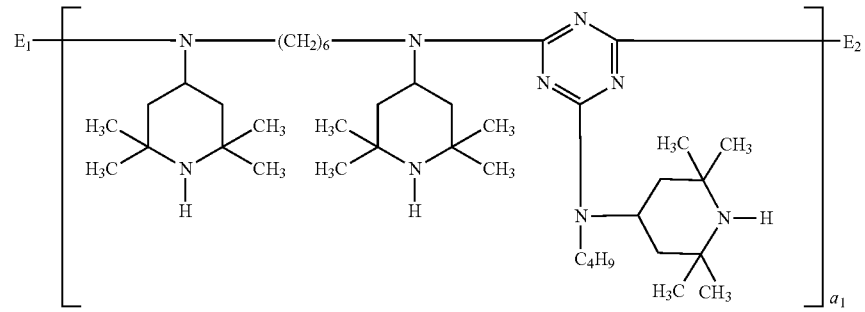

wherein $E_1$ is

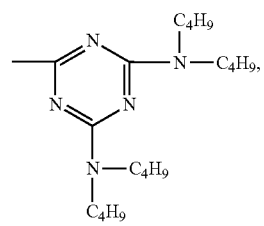

$E_2$ is

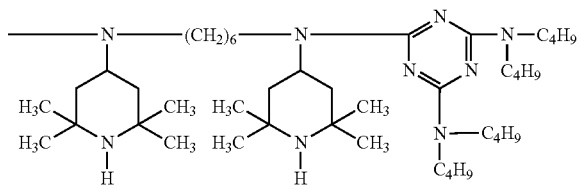

and $a_1$ is a number from 2 to 10.

Cyasorb® UV 3346 [Component A)]:
(CAS number: 82451-48-7)
Poly [(6-morpholino-s-triazine-2,4-diyl)[2,2,6,6-tetramethyl-4-piperidyl)imino]-hexamethylene[(2,2,6,6-tetramethyl-4-piperidyl)imino]]

Hycite®713 [Component B)]:
(CAS number: 012304-65-3 or 11097-59-9)
Hydrotalcite (Magnesium aluminum hydroxide carbonate hydrate)

Irqanox®1330 [Component C)]:
(CAS number: 1709-70-2)
1,3,5-Tris(3,5-di-tert-butyl-4-hydroxybenzyl)-2,4,6-trimethylbenzene Sumilizer®GP [Component C)]:
(CAS number: 203255-81-6)
6-[3-(3-tert-Butyl-4-hydroxy-5-methylphenyl)propoxy]-2,4,8,10-tetra-tert-butyldibenzo[d,f][1,3,2]dioxaphosphepin Hostanox® O 3 [Component C)]:
(CAS number: 32509-66-3)
Ethylene bis[3,3-bis(3-tert-butyl-4-hydroxyphenyl)butyrate]

Irgafos®168 [Component D)]:
(CAS number: 31570-04-4)
Tris[2,4-di-tert-butylphenyl]phosphite Compound D-1 [Component D)]:
Compound (108) disclosed in Example S-8 of WO-A-2015/121445.
[2,2'-Ethylene-bis-(4,6-di-tert. butyl-phenyl)-1,1'-diyl]-[2,6-dimethyl-4(5,7-di-tert. butyl)-3H-1-benzofuran-2-one)-phenyl]-phosphite.

Doverphos® S-9228 [Component D)]:
(CAS number: 154862-43-8)
Bis(2,4-dicumylphenyl)pentaerythritoldiphosphite Irgafos® 12 [Component D)]:
(CAS number: 80410-33-9)
2,2'2'''-nitrilo[triethyl-tris[3,3',5,5'-tetra-tert-butyl-1,1'-biphenyl-2,2'-diyl]]phosphite Compound D-2 [Component D)]:

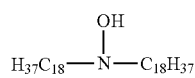

Irganox® E 201 [Component D)]:
(CAS number 10191-41-0)
Vitamin E
Vitamin E-Acetate [Component D)]

EXAMPLES

Preparation of the test specimens: A mixture of a non-stabilised polypropylene (Moplen HF501 N of LyondellBasell) and the additives listed in Table 1 is mixed with a laboratory mixer MTI M 20.

The obtained full formulation is then compounded on a Collin ZK25Ex42D extruder at 230° C. and then injection molded on an Arburg Allrounder Selecta 320 S 500-150 injection molding machine at 230° C.

On the injection molded plaques 44 mm×68 mm×2 mm, the parameters measured are OIT Values (Oxidative Induction Time) using a DSC Q2000 of TA Instrument (Waters) at 180° C. under $O_2$, according to ISO 11357-6. The results are listed in Table 2.

TABLE 1

(Additive Formulations):

| Additive Formulation | No. |
|---|---|
| 0.3% Irganox ® 1330 + 0.1% Irgafos ® 168 | 1C |
| 0.3% Irganox ® 1330 + 0.2% Hycite ® 713 + 0.1% Irgafos ® 168 | 2C |
| 0.3% Irganox ® 1330 + 0.2% Chimassorb ® 2020 + 0.1% Irgafos ® 168 | 3C |
| 0.3% Irganox ® 1330 + 0.4% Hycite ® 713 + 0.1% Irgafos ® 168 | 4C |
| 0.3% Irganox ® 1330 + 0.4% Chimassorb ® 2020 + 0.1% Irgafos ® 168 | 5C |
| 0.3% Irganox ® 1330 + 0.2% Chimassorb ® 2020 + 0.2% Hycite ® 713 + 0.1% Irgafos ® 168 | 1I |
| 0.3% Irganox ® 1330 + 0.2% Chimassorb ® 2020 + 0.2% Hycite ® 713 + 0.1% Doverphos ® S-9228 | 2I |
| 0.3% Irganox 1330 ® + 0.2% Chimassorb ® 2020 + 0.2% Hycite ® 713 + 0.1% Irgafos ® 12 | 3I |
| 0.3% Irganox ® 1330 + 0.2% Chimassorb ® 2020 + 0.2% Hycite ® 713 + 0.1% Sumilizer ® GP | 4I |
| 0.3% Irganox ® 1330 + 0.2% Chimassorb ® 2020 + 0.2% Hycite ® 713 + 0.1% Compound D-1 | 5I |
| 0.3% Irganox ® 1330 + 0.2% Chimassorb ® 2020 + 0.2% Hycite ® 713 + 0.08% Compound D-1 + 0.08% Irgafos ® 168 | 6I |
| 0.3% Irganox ® 1330 + 0.2% Chimassorb ® 2020 + 0.2% Hycite ® 713 + 0.1% Compound D-2 | 7I |
| 0.3% Irganox ® 1330 + 0.2% Chimassorb ® 2020 + 0.2% Hycite ® 713 + 0.05% Irganox ® E 201 + 0.05% Vitamin E-Acetate 0.3% Hostanox ® O 3 + 0.2% Chimassorb ® 2020 + 0.2% Hycite ® 713 + 0.1% Irgafos ® 168 | 8I 9I |
| 0.3% Irganox ® 1330 + 0.2% Cyasorb ® UV 3346 +0.2% Hycite ® 713 + 0.1% Irgafos ® 168 | 10I |

TABLE 2

(Results):

| Additive Formulation No. | OIT Results/Minutes |
|---|---|
| 1C | 149 |
| 2C | 201 |
| 3C | 265 |
| 4C | 270 |
| 5C | 365 |
| 1I | 414 |
| 2I | 447 |
| 3I | 413 |
| 4I | 435 |
| 5I | 372 |
| 6I | 412 |
| 7I | 299 |
| 8I | 335 |
| 9I | 269 |
| 10I | 355 |

High OIT-values are desired.

Examples with Additive Formulations 1C to 5C are comparative Examples, those of Formulations 1I to 10I are inventive Examples.

The invention claimed is:

1. A polypropylene composition comprising components A), B), C), and D), wherein component A) is a compound having formula (A-I-1)

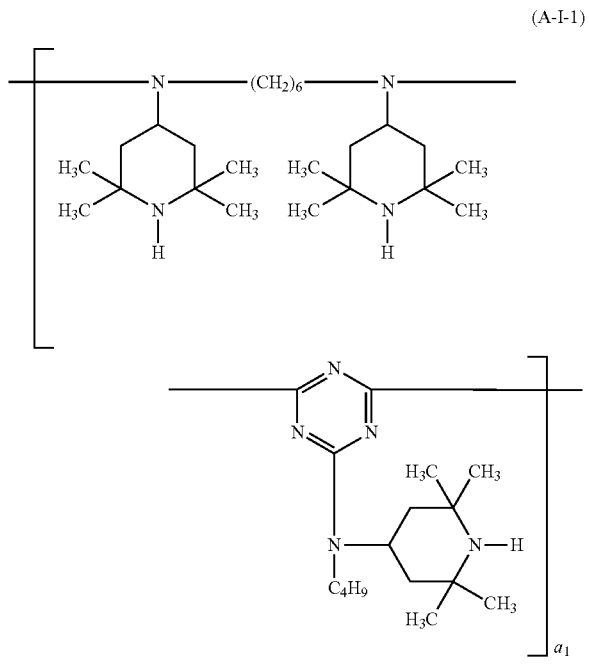

(A-I-1)

with a₁ being 2 to 10, component B) is a natural or synthetic hydrotalcite, component C) is 1,3,5-tris(3,5-di-tert-butyl-4-hydroxybenzyl)-2,4,6-trimethylbenzene, and component D) is a phosphite, and wherein the weight ratio of component A) to component B) is 1:10 to 10:1.

2. The polypropylene composition according to claim 1, wherein component B) is at least one magnesium aluminum hydroxide carbonate hydrate or zinc aluminum hydroxide carbonate hydrate.

3. The polypropylene composition according to claim 1, wherein
component D) is tris [2,4-di-tert-butylphenyl]phosphite.

4. The polypropylene composition according to claim 1, wherein component D) is tris(2,4-di-tert-butylphenyl) phosphite, [3,3',5,5'-tetra-tert. butyl-1,1'biphenyl-2,2'-diyl]-[3-(3-methyl-4-hydroxy-5-tert. butyl-phenyl)-propyl]-phosphite, [2,2'-ethylene-bis-(4,6-di-tert. butyl-phenyl)-1,1'-diyl]-[2,6-dimethyl-4-(5,7-di-tert. butyl)-3H-1-benzofuran-2-one)-phenyl]-phosphite, [2,2'-ethylene-bis-(4,6-di-tert. butyl-phenyl)-1,1'-diyl]-[1-methyl-6-tert. butyl-4-(5,7-di-tert. butyl)-3H-1-benzofuran-2-one)-phenyl]-phosphite, 6-[3-(3-tert-butyl-4-hydroxy-5-methylphenyl) propoxy]-2,4,8,10-tetra-tert-butyldibenzo[d,f][1,3,2]dioxaphosphepin, bis(2,4-dicumylphenyl) pentaerythritoldiphosphite or 2,2'2"-nitrilo [triethyl-tris [3,3',5,5'-tetra-tert-butyl-1,1'-biphenyl-2,2'-diyl]]phosphite.

5. An article comprising the polypropylene composition according to claim 1, wherein the article is in a form of a pipe, cable or geomembrane.

6. An article comprising the polypropylene composition according to claim 1, wherein the article is in a form of a pipe or geomembrane.

7. An article comprising the polypropylene composition according to claim 1, wherein the article is in a form of a pipe or geomembrane which is in contact with oxidizing media.

8. An article comprising the polypropylene composition according to claim 1, wherein the article is in a form of a pipe.

9. An article comprising the polypropylene composition according to claim 1, wherein the article is in a form of a pipe which is in contact with chlorinated water.

10. A method for stabilizing polypropylene comprising mixing a mixture comprising components A) and B) in a weight ratio of 1:10 to 10:1 and components C) and D), each as defined in claim 1, with polypropylene.

* * * * *